US005954834A

United States Patent [19]
Hassan et al.

[11] Patent Number: 5,954,834
[45] Date of Patent: Sep. 21, 1999

[54] SYSTEMS AND METHODS FOR COMMUNICATING DESIRED AUDIO INFORMATION OVER A COMMUNICATIONS MEDIUM

[75] Inventors: Amer Hassan; Yongbing Wan; Peter D. Karabinis, all of Cary, N.C.

[73] Assignee: Ericsson Inc., Research Triangle Park, N.C.

[21] Appl. No.: 08/728,159

[22] Filed: Oct. 9, 1996

[51] Int. Cl.⁶ .................................................. H03M 13/00
[52] U.S. Cl. ...................... 714/758; 714/747; 375/200; 375/202; 704/228; 379/39
[58] Field of Search ................... 371/37.7, 31; 375/200, 375/202; 326/105; 704/228; 380/29; 379/39.14; 395/200.66

[56] References Cited

U.S. PATENT DOCUMENTS

| | | | |
|---|---|---|---|
| 4,351,983 | 9/1982 | Crouse et al. | 179/1 SC |
| 4,532,636 | 7/1985 | Wilkinson | 375/1 |
| 5,299,198 | 3/1994 | Kay et al. | 370/95.3 |
| 5,475,712 | 12/1995 | Sasaki | 375/241 |
| 5,513,183 | 4/1996 | Kay et al. | 370/95.3 |
| 5,537,509 | 7/1996 | Swaminathan et al. | 395/2.37 |
| 5,539,858 | 7/1996 | Sasaki et al. | 395/2.21 |

FOREIGN PATENT DOCUMENTS

| | | |
|---|---|---|
| 0 422 802 A1 | 4/1991 | European Pat. Off. . |
| 0736858A2 | 10/1996 | European Pat. Off. . |
| 42 16 911 A1 | 5/1992 | Germany . |
| 2 288 102 | 10/1995 | United Kingdom . |
| WO 92/22891 | 12/1992 | WIPO . |

OTHER PUBLICATIONS

CB Southcott et al., Voice Control of the Pan–European Digital Mobile Radio System, Communications Technology For The 1990's And Beyond, 1989 IEEE, vol. 2, Nov. 27–30, 1989, Dallas, TX, 29B.3.1–29B.3.4, pp. 1070–1074.

Huan–yu Su et al., Improving The Speech Quality of Cellular Mobile Systems Under Heavy Fading; International Conference On Acoustics, Speech And Signal Processing (ICASSP), 1992 IEEE, vol. 2, Mar. 23–26, 1992, ISAN Francisco, CA, II–121–II–124, pp. 121–124.

International Search Report, PCT/US97/18153, Jan. 30, 1998.

*Primary Examiner*—William Grant
*Assistant Examiner*—McDieunel Marc
*Attorney, Agent, or Firm*—Myers Bigel Sibley & Sajovec

[57] ABSTRACT

Desired audio information intermittently present in a first audio signal is communicated over a communications medium by generating a first communications signal in the communications medium when the desired audio information is present in the first audio signal, the first communications signal representing the first audio signal encoded as blocks of communications data according to a predetermined code. A second communications signal is received from the communications medium. The received second communications signal is processed to produce processed blocks of communications data. A metric representing the validity of a plurality of the processed blocks of communications data is then determined, and a second audio signal is generated from the plurality of processed blocks of communications data when the metric is within a predetermined range. A filler audio signal such as comfort noise is generated, preferably from predetermined audio data derived from a previously received communications signal, when the metric is outside of the predetermined range. Preferably, generation of the first communications signal is discontinued when the desired audio information is absent from the audio signal, without generating an explicit discontinuity message. The discontinuous transmission function may be implemented using a separate cyclic redundancy coding (CRC) scheme, or may be implemented using a combined decoding metric derived from a forward error correction coding scheme.

32 Claims, 10 Drawing Sheets

FIG. 7 ns systems
SYSTEMS AND METHODS FOR COMMUNICATING DESIRED AUDIO INFORMATION OVER A COMMUNICATIONS MEDIUM

FIELD OF THE INVENTION

The present invention relates to communications systems and methods and, in particular, to systems and methods for communicating audio information in communications systems.

BACKGROUND OF THE INVENTION

During the course of a typical communications session between users in a communications system, a good deal of the information communicated may be non-essential, consisting of background noise or other information which is of little or no use to the end users. For example, in an audio application such as radiotelephony, each user may be "silent," e.g., not communicating voice or other desired audio information, more than 50% of the time during a communications session. Communication of silence or other content-less background audio over the channel generally represents an inefficient use of system resources, e.g., bandwidth, channel capacity, and power. Thus, it may be desirable to discontinue transmission from a station over the channel when the audio signal at the station carries no voice information, in order to conserve energy and to allow other users to use the channel during idle periods.

For this reason, discontinuous transmission (DTX) is often used in communications systems. In conventional cellular radiotelephone systems, for example, DTX may be implemented by communicating an explicit message containing information as to transitions of the state of a transmittingstation, e.g., active-to-idle, idle-to active, to a receiving station in order to control reception. This status message may be communicated on a dedicated status channel or as a message on a traffic channel. For example, a "silence descriptor," i.e., an explicit message indicating lack of voice activity, may be transmitted from the transmitting station to indicate voice inactivity, as described in U.S. Pat. No. 5,475,712 to Sasaki.

DTX can help improve spectral efficiency by freeing channels for use by other users during idle periods. In addition, discontinuous transmission can reduce co-channel interference, by reducing the probability of collisions between channels. Reduced co-channel interference can in turn allow higher channel density, as the likelihood of unacceptable interference between channels is reduced.

DTX offers additional benefits for power-sensitive applications such as mobile satellite radiotelephone applications. In addition to having finite bandwidth and channel capacity, the energy available for transmission of communications signals from the satellite or the mobile unit tends to be limited. Thus, it generally is desirable to avoid wasting satellite energy on the communication of non-essential audio information. By employing DTX, a satellite-based communications system can conserve satellite and mobile power by preventing the transmission of communications signals corresponding to non-essential audio information.

Unfortunately, however, conventional DTX techniques may still consume a significant amount of system resources. Dedicated signalling channels can occupy bandwidth which might otherwise be available for traffic, and consume energy in the communication of status signals. Similarly, the use of silence descriptors may decrease available channel capacity and increase power consumption in the transmission of the silence descriptor.

SUMMARY OF THE INVENTION

In light of the foregoing, it is an object of the present invention to provide systems and methods for efficiently communicating audio information over a communications medium.

It is another object of the present invention to provide systems and methods for communicating desired audio information without requiring dedicated signalling channels, silence descriptors or other explicit discontinuity messages.

These and other objects, features and advantages are provided according to the present invention in communications systems and methods in which a first communications signal representing a first audio signal encoded according to a predetermined code is generated in a communications medium when the desired audio information is present in the audio signal. A second communications signal is then received and processed to produce blocks of communications data, and an second audio signal is generated from a plurality of the processed blocks when a metric of the validity of the plurality of blocks, for example, a count of the number of errors in a sequence of blocks, is within a predetermined range. If the metric is outside of the predetermined range, indicating discontinuous transmission, a filler audio signal is generated, preferably "comfort noise" derived from a previously received communications signal. Decoding for detection of discontinuous transmission may be implemented using a decoding mechanism separate of decoding mechanisms for error detection and recovery, or a single decoding mechanism can be used which generates a per block metric for error detection and correction, and combines per block metrics for a plurality of blocks to implement detection of discontinuous transmission.

Utilizing discontinuous transmission, the present invention can provide increased efficiency by preventing unnecessary transmission of undesirable background or other audio information. This increased efficiency can help conserve power resources, which may be especially important in mobile satellite applications. Using coding techniques to detect discontinuous transmission allows the present invention to implement discontinuous transmission without requiring dedicated signalling channels or the transmission of silence descriptors or other explicit discontinuity messages. The coding function used for discontinuous transmission can be efficiently combined with existing error detection and correction coding functions.

In particular, according to the present invention, a communications system for communicating desired audio information intermittently present in a first audio signal over a communications medium includes a discontinuous communications signal generator for generating a first communications signal in the communications medium when the desired audio information is present in the audio signal, the first communications signal representing the first audio signal encoded as blocks of communications data according to a predetermined code. A communications signal receiver receives a second communications signal from the communications medium. A communications signal processor processes the received second communications signal to produce processed blocks of communications data. A metric determiner determines a metric representing the validity of a plurality of the processed blocks of communications data. An audio signal generator generates a second audio signal from the plurality of processed blocks of communications data when the metric is within a predetermined range and generates a filler audio signal when the metric is outside of the predetermined range.

The discontinuous communications signal generator preferably discontinues generation of the first communications signal when the desired audio information is absent from the first audio signal. Preferably, the desired audio information is voice information, and a voice activity detector is utilized for discontinuing generation of the first communications signal when voice activity is absent from the first audio signal. Discontinuation of generation of the first communications signal preferably occurs without generating an explicit discontinuity message.

The discontinuous communications signal generator also preferably includes an encoder for encoding the first audio signal according to the predetermined code to produce coded blocks of communications data, and a communications signal generator, responsive to the encoder for generating the first communications signal from the coded blocks of communications data. According to a first embodiment, the encoder includes a forward error correction encoder for encoding the first audio signal according to a forward error correction code to produce forward error correction coded blocks of communications data, with the communications signal generator including a generator for the first communications signal from the forward error correction coded blocks of communications data. The communications signal processor includes a forward error control decoder for decoding the received second communications signal according to the forward error correction code to produce decoded blocks of communications data and a forward error correction decoding metric for each of the decoded blocks of communications data, the forward error correction decoding metric representing the validity of the corresponding decoded block of communications data. The metric determiner includes a combiner, responsive to the forward error control decoder, for combining forward error correction decoding metrics of a plurality of the decoded blocks of communications data to determine a combined metric of the validity of the plurality of decoded blocks of communications data, and the audio signal generator includes a generator for generating the second audio signal from the decoded blocks of communications data when the combined metric is within a predetermined range and for generating the filler audio signal when the combined metric is outside of the predetermined range.

Preferably, the combiner for combining forward error correction decoding metrics includes a combiner for combining forward error correction decoding metrics of a sequential plurality of the decoded blocks of communications data. The forward error correction encoder may include a convolutional encoder for encoding the first audio signal according to a convolutional code to produce convolutionally coded blocks of communications data, with the forward error correction decoder including a convolutional decoder for decoding the received second communications signal according to the convolutional code to produce decoded blocks of communications data and a convolutional decoding metric for each of the decoded blocks of communications data, the convolutional decoding metric representing the validity of the corresponding decoded block of communications data.

According to a second embodiment, the encoder may include a cyclic redundancy code (CRC) encoder for encoding the first audio signal according to a CRC to produce CRC coded audio data, and a forward error correction encoder, responsive to the CRC encoder, for encoding the CRC coded audio data according to a forward error correction code to produce forward error correction coded blocks of communications data. The communications signal generator includes a generator for generating the first communications signal from the forward error correction coded blocks of communications data. The communications signal processor includes a forward error correction decoder for decoding the received second communications signal according to the forward error correction code to produce decoded blocks of communications data and a CRC decoder, responsive to the forward error correction decoder, for decoding the decoded blocks of communications data according to the CRC to produce CRC decoded blocks of communications data and to determine a CRC metric for each of the CRC decoded blocks of communications data. The metric determiner includes a combiner for combining CRC metrics of a plurality, preferably sequential, of the CRC decoded blocks of communications data to determine a combined metric of the validity of the plurality of CRC decoded blocks of communications data. The combiner for combining CRC metrics of a plurality of the CRC decoded blocks of communications data may include the capability for setting the combined metric to an initial value within the predetermined range, and incrementer, responsive to the CRC decoder, for incrementing the combined metric for each CRC decoded block of the plurality of CRC decoded blocks of communications data which has a CRC metric indicating an error.

The audio signal generator preferably includes a capability for generating comfort noise when the metric is outside of the predetermined range, preferably from predetermined audio data. The system also preferably includes the capability for deriving the predetermined audio data from a previously received communications signal.

According to method aspects of the present invention, a communications signal is received from a communications medium. The received communications signal is processed to produce processed blocks of communications data. A metric representing the validity of a plurality of the processed blocks of communications data is then determined. An audio signal is generated from the plurality of processed blocks of communications data when the metric is within a predetermined range and a filler audio signal is generated when the metric is outside of the predetermined range. Efficient techniques for communicating audio information are thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
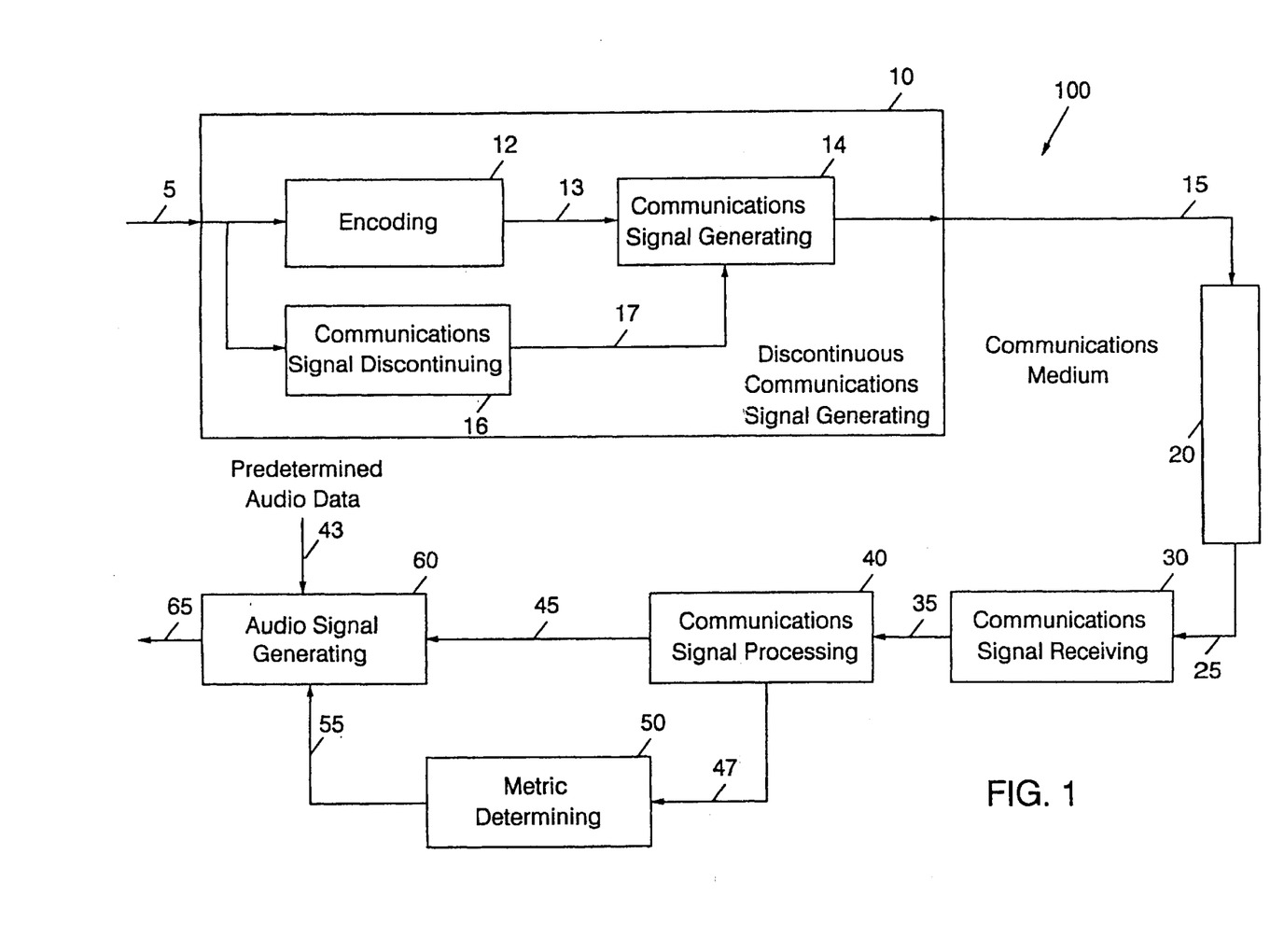
FIG. 1 is a schematic diagram illustrating a communications system according to the present invention.

Referring now to FIG. 1, a communications system 100 according to the present invention includes discontinuous communications signal generator 10, which serves as means for generating a first communications signal 15 in a communications medium 20, and communications signal receiver 30 which serves as means for receiving a second communications signal 25 from the communications medium 20. A communications signal processor 40 serves as means for processing the received second communications signal 35 to produce blocks of communications data 45, and a metric determiner 50 serves as means for determining a metric 55 of the validity of a plurality of the blocks of communications data 45. As illustrated, the metric 55 may, for example, be determined from decoding metrics 47 produced by the communications signal processor 40. The system 100 also includes an audio signal generator 60 which serves as means for generating an audio output 65 which is either a second audio signal generated from the plurality of blocks of communications data 45 when the metric 55 is within a predetermined range or a filler audio signal generated when the metric 55 is outside of the predetermined range, preferably comfort noise generated from predetermined audio data 43.

Those skilled in the art will understand that the discontinuous communications signal generator 10, communications signal receiver 30, communications signal processor 40, metric determiner 50, audio signal generator 60 and elements thereof may include various communications components such as signal processors, filters, modulators, amplifiers, transmitters, and antennas. These elements may be implemented using special purpose hardware, software running on computers or other data processing hardware, or combinations thereof. For purposes of the following description of embodiments of the present invention, the operations of these components are well known to those skilled in the art and need not be discussed in detail herein.

As will be appreciated by those skilled in the art, communications systems typically communicate information by transmitting and receiving communications signals representing blocks of data. For example, in global system for mobile communication (GSM) radiotelephone systems, voice traffic typically is transmitted in blocks containing a predetermined number of symbols or bits, each block including delimiters to indicate the beginning and end of the block. The use of blocks facilitates decoding of received signals, for example, in block or finite constraint convolutional decoders. Coding schemes and block formats used in the GSM system are described in detail in *"The GSM for Mobile Communications"* by Mouly and Pautet, 1992.

When desired audio information is present in the first audio signal 5, discontinuous communications signal generator 10 generates the first communications signal 15 representing the first audio signal 5 encoded as blocks of communications data according to a predetermined code. As illustrated in FIG. 1, discontinuous communications signal generator 10 preferably includes an encoder 12 which serves as means for encoding the first audio signal 5 according to the predetermined code to produce blocks of coded communications data 13, and a communications signal generator 14 which serves as means for generating the first communications signal 15 from the blocks of coded communications data 13. Discontinuous signal generator 10 also preferably includes a portion (represented by Block 16) for discontinuing generation of the first communications signal 15 when the desired audio data is absent from the first audio signal 5, for example, by generating an inhibit signal 17 to the communications signal generator 14. Preferably, generation of the first communications signal 15 is discontinued when the desired audio information is absent from the first audio signal 5, without the generation of a silence descriptor or other explicit discontinuity message indicating discontinuous transmission due to the absence of desired information in the first audio signal 5.

As will be appreciated by those skilled in the art, when a communications signal is generated in a communications medium, e.g., the atmosphere, the signal as received will generally be distorted due to mechanisms such as multipath fading and co-channel interference. Therefore, although it may contain some or all of the information content of the first communications signal 15 produced by the discontinuous communications signal generator 10, the second communications signal 25 received by the communications signal receiver 30 is nonetheless generally a different communications signal than the generated first communications signal 15, i.e., a signal which represents a distorted or otherwise transformed version of the generated signal 15. In addition, during periods in which the discontinuous communications signal generator 10 is not generating the first communications signal, e.g., when no voice activity is occurring, the second communications signal 25 received by the communications signal receiver 30 will generally represent "background noise," e.g., a combination of signals from other transmitters and interference sources.

According to the present invention, the communications signal processor 40 processes the received second communications signal 25, whether containing the information content of the first communications signal 15 or background noise, and produces blocks of communications data 45 corresponding to the received second communications signal 25. The metric determiner 50 determines a metric 55 of the validity of a plurality of the processed blocks 45, preferably a combined metric corresponding to a combination of decoding metrics produced in processing the received communications signal 25. The metric 55 is then used to guide further processing of the processed blocks 45 to generate a second audio signal in the audio signal generator 60.

Figure 2A:
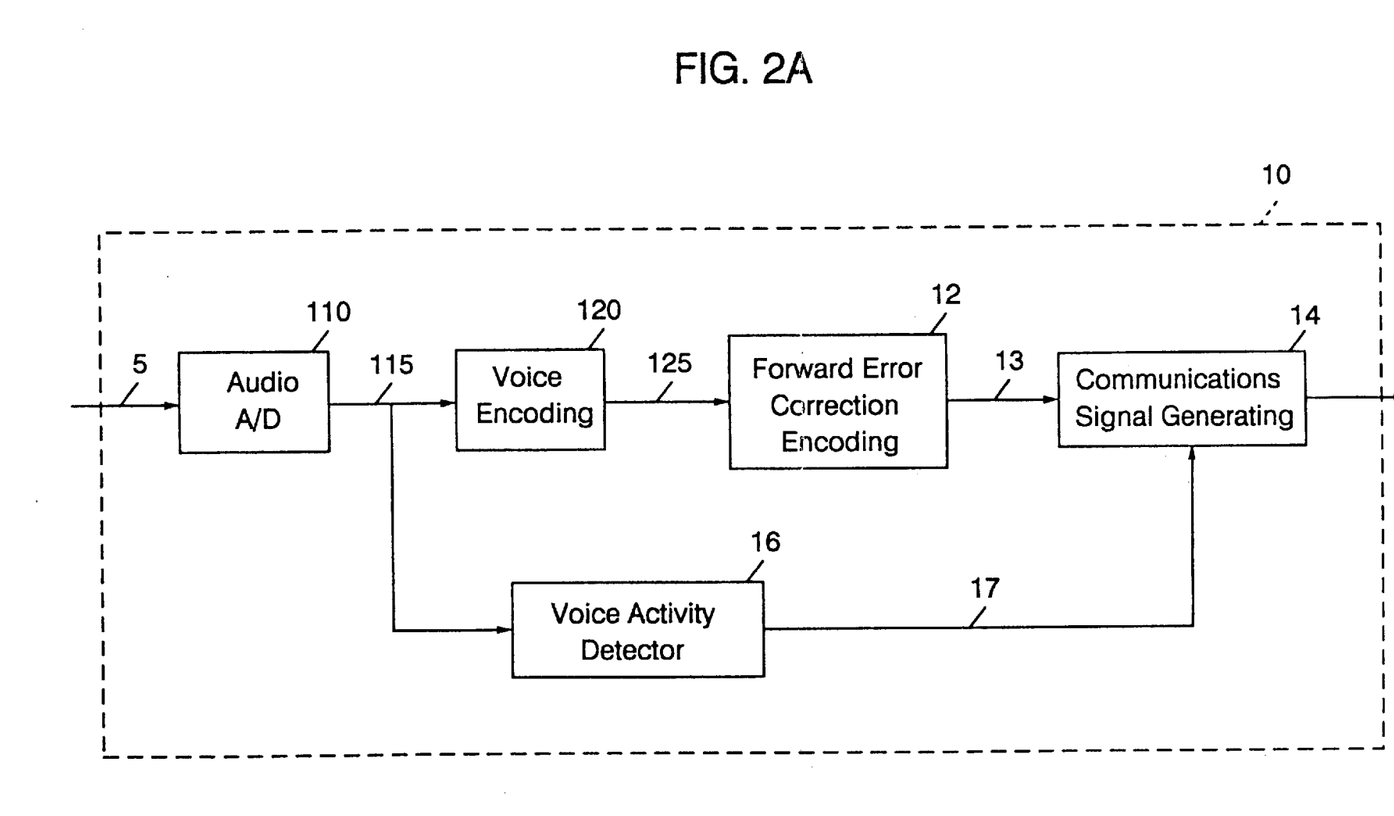
FIGS. 2A–B are schematic diagrams illustrating a first embodiment of a communications system according to the present invention.
Figure 2B:
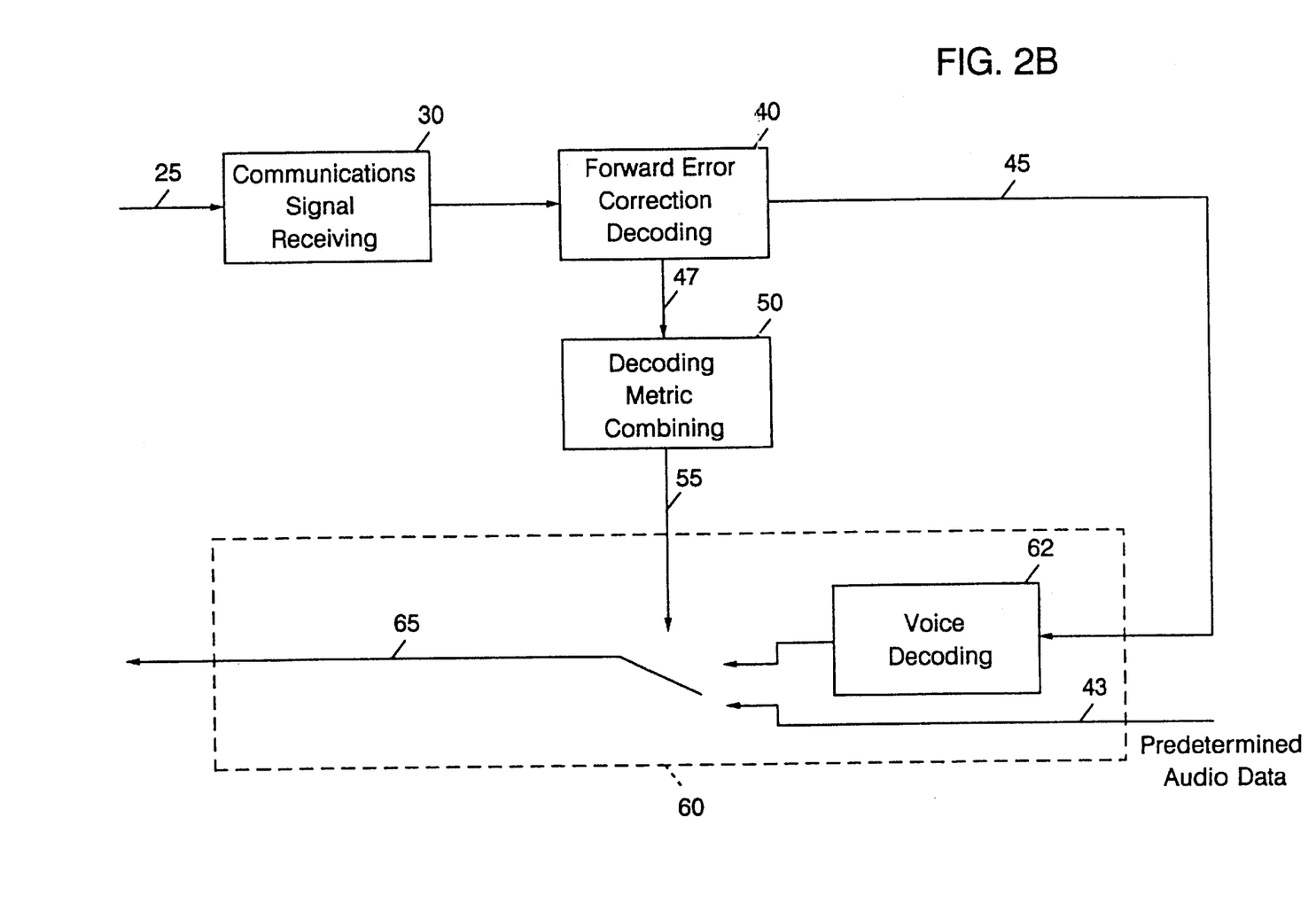

FIGS. 2A–B illustrate a first embodiment according to the present invention. Referring to FIG. 2A, the discontinuous communications signal generator 10 may include various audio signal processing components, for example, an audio analog-to-digital converter (A/D) 110 which converts the first audio signal 5 into digital audio data 115. Voice encoder 120 which serves as means for encoding the digital audio data 115 to produce coded digital audio data 125 may be included, for example, to compress the digital audio data 115 to produce coded audio data 125 which has reduced redundancy. The discontinuing portion 16 of the discontinuous communications signal generator 10 preferably includes the capability of detecting the absence of desired audio information, preferably voice information. For example, the discontinuing portion 16 may include a voice activity detector which generates a signal 17 to enable or inhibit communications signal generator 14 based on the presence or absence of desired voice information. An example of such a voice activity detector is described in U.S. Pat. No. 4,351, 983 to Crouse et al. The encoder 12 of the discontinuous communications signal generator 20 may also include a forward error correction encoder for encoding the first audio signal 5 according to a forward error correction code such that the coded communications data 13 includes forward error correction coded blocks of communications data.

As illustrated in FIG. 2B, the communications signal processor 40 may include a forward error correction decoder for decoding the received second communications signal 35 according to the forward error correction code, producing blocks of communications data 45 and a corresponding forward error correction decoding metric 47 for each decoded block of communications data. The metric determiner 50 may include a decoding metric combiner for combining the decoding metrics 47 produced for a plurality of decoded blocks of communications data 45 to produce a combined metric 55. If the combined metric 55 is within the predetermined range, the audio signal generator 60 produces the second audio signal from the decoded blocks of communications data 45, perhaps after voice decoding in voice decoder 62. Otherwise, the filler audio signal is generated.

Those skilled in the art will appreciate that, in decoding a given block of communications data, conventional decoders typically generate a metric which provides a measure of the validity of the decoded block of communications data. The metric for a particular decoded block typically is used to determine whether that block has been corrupted in transmission over the communications medium. According to the present invention, individual metrics from a plurality of decoded blocks may be combined to produce a metric which is used to detect discontinuous transmission.

Figure 3A:
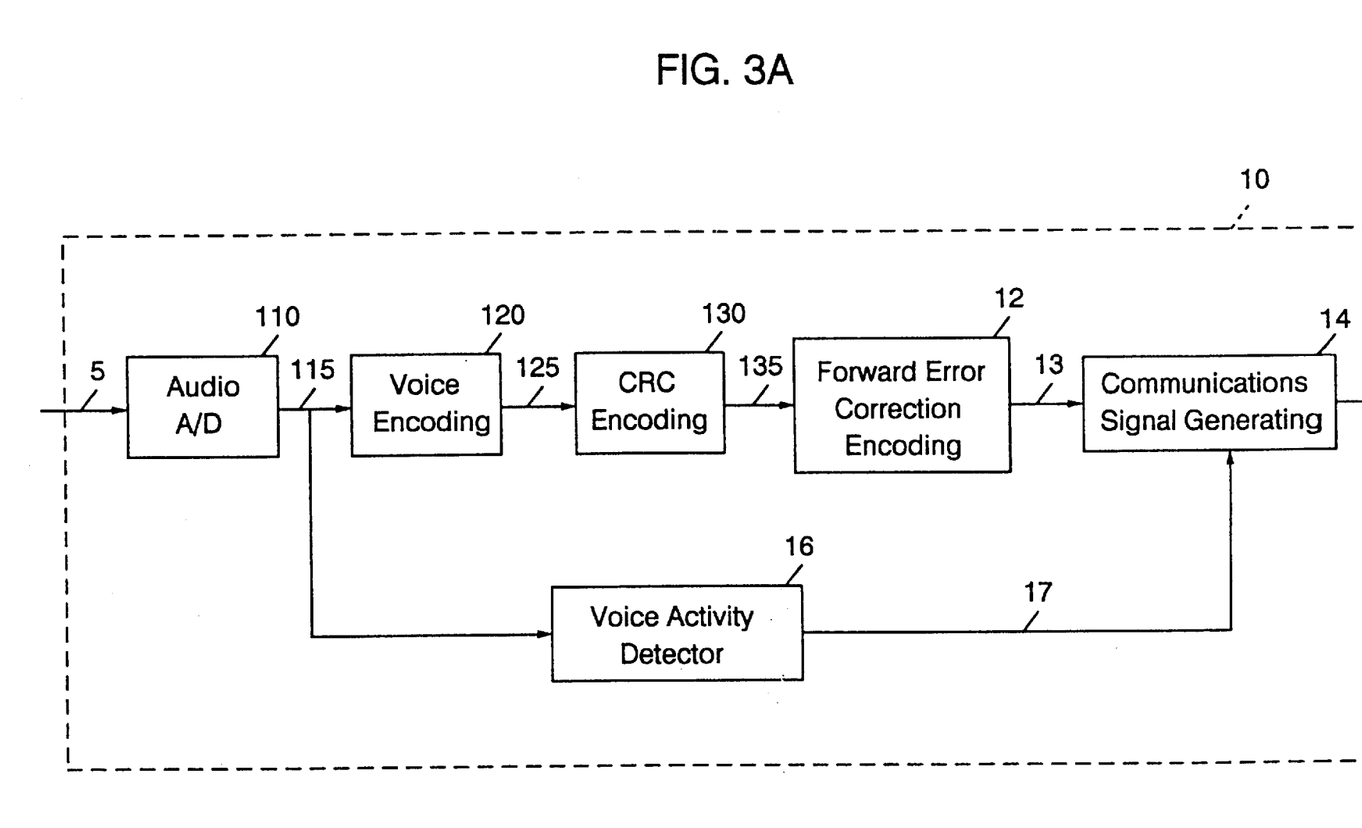
FIG. 3A–B are schematic diagrams illustrating a second embodiment of a communications system according to the present invention.
Figure 3B:
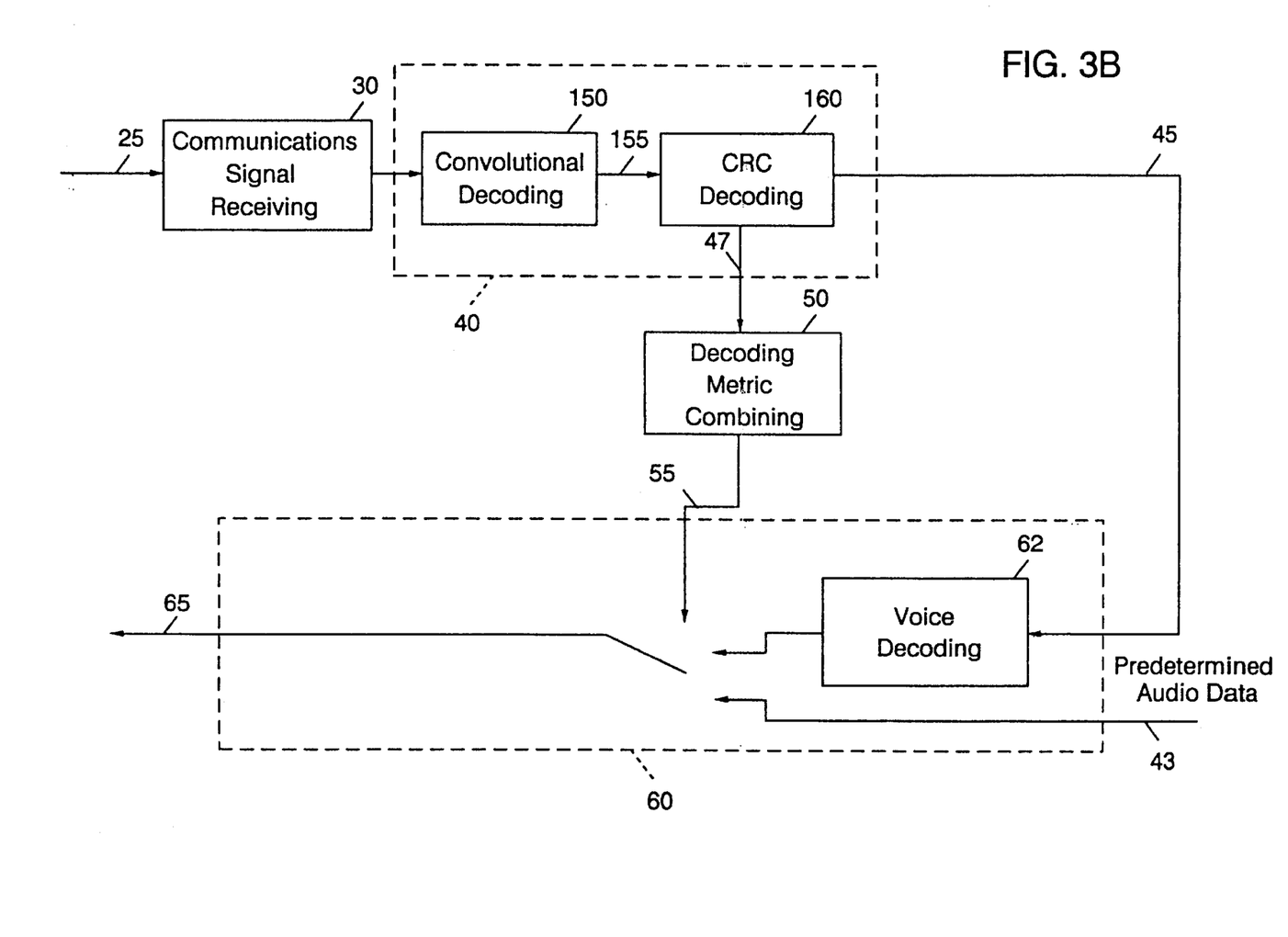

Coding for discontinuous transmission according to the present invention may be implemented in a number of ways. For example, coding for discontinuous transmission may be integrated with forward error correction coding as in the illustrated embodiment described above, or as a separate coding function. According to a second embodiment illustrated in FIGS. 3A–B, encoder 12 may include cyclic redundancy code (CRC) encoder 130 which serves as means for encoding the first audio signal 5 according to a CRC to produce CRC coded audio data 135. Encoder 12 may also include a forward error correction encoder 140, here shown as including convolutional encoder, for encoding the CRC coded audio data 135 according to a forward error correction code, e.g., a convolutional code, to produce forward error correction coded blocks of communications data 13. As illustrated in FIG. 3B, communications signal processor 40 may include a forward error correction decoder 150, here shown as a convolutional decoder, for decoding the received second communications signal 35 according to the forward error correction code to produce decoded blocks of communications data 155. The decoded blocks of communications data 155 are then decoded according to the CRC in CRC decoder 160, to produce CRC decoded blocks of communications data 45 and CRC metrics 47 for each of the blocks. Each CRC metric 47 indicates the validity of the corresponding CRC decoded block of communications data 45. The CRC metrics 47 for a plurality of CRC decoded blocks of communications data 45 are combined in decoding metric combiner 50, to produce a combined metric 55 which is in turn used to guide the generation of the audio output 65 as discussed above.

Figure 4:
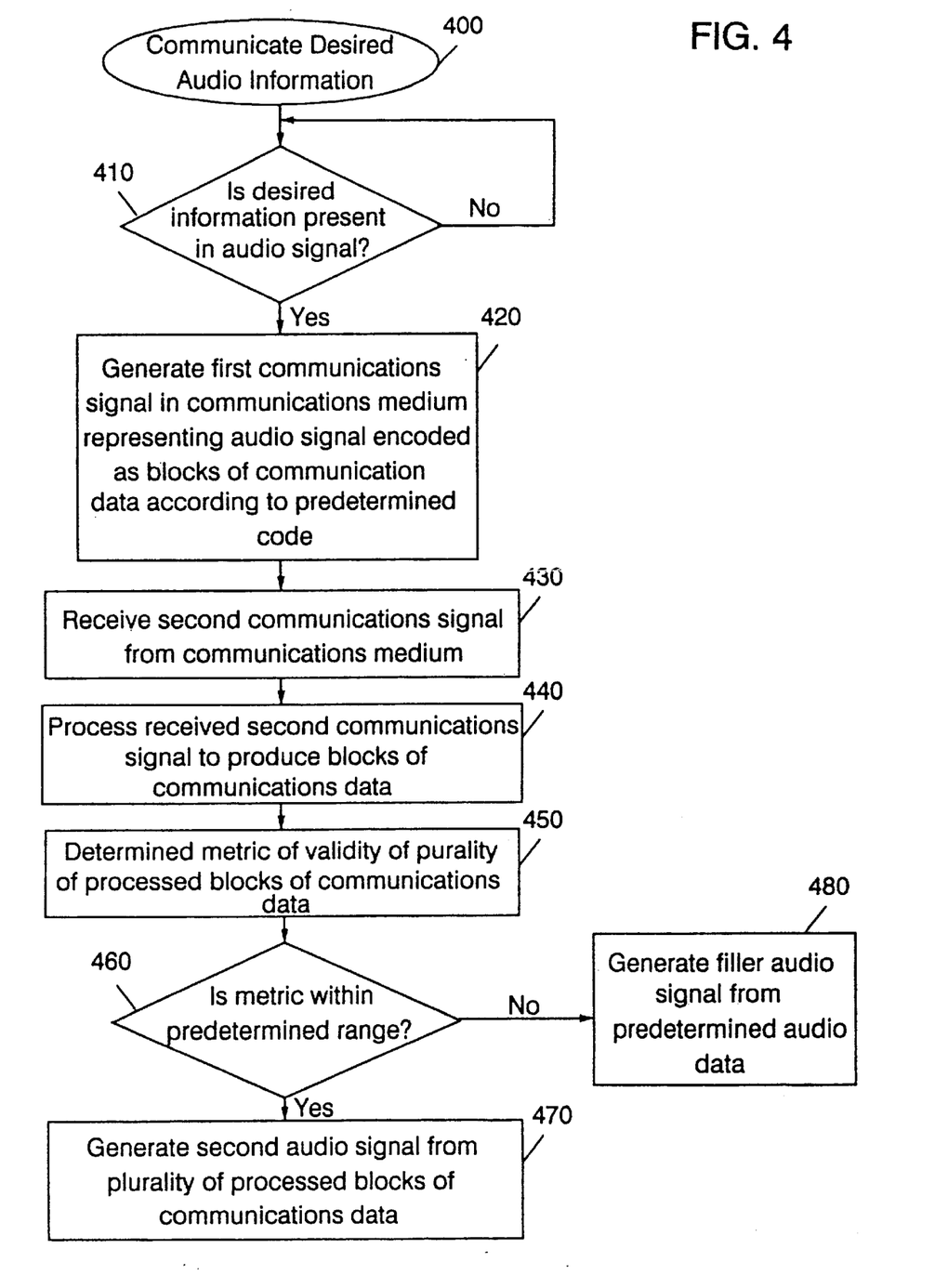
FIG. 4 is a flowchart illustration of operations for communicating audio information according to the present invention.

FIG. 4 illustrates operations for communicating desired audio information in an audio signal over a communications medium according to the present invention (Block 400). If desired audio information is present in the audio signal (Block 410), a communications signal is generated in the communications medium (Block 420). A communications signal is received from the communications medium (Block 430), and the received communications signal is processed to produce blocks of communications data (Block 440). A metric of the validity of a plurality of the processed blocks of communications data is then determined (Block 450). If the metric is within a predetermined range (Block 460), a second audio signal is generated from the plurality of processed blocks of communications data (Block 470). If the metric is outside of the predetermined range (Block 460), a filler audio signal is generated, preferably from predetermined audio data (Block 480).

Figure 5A:
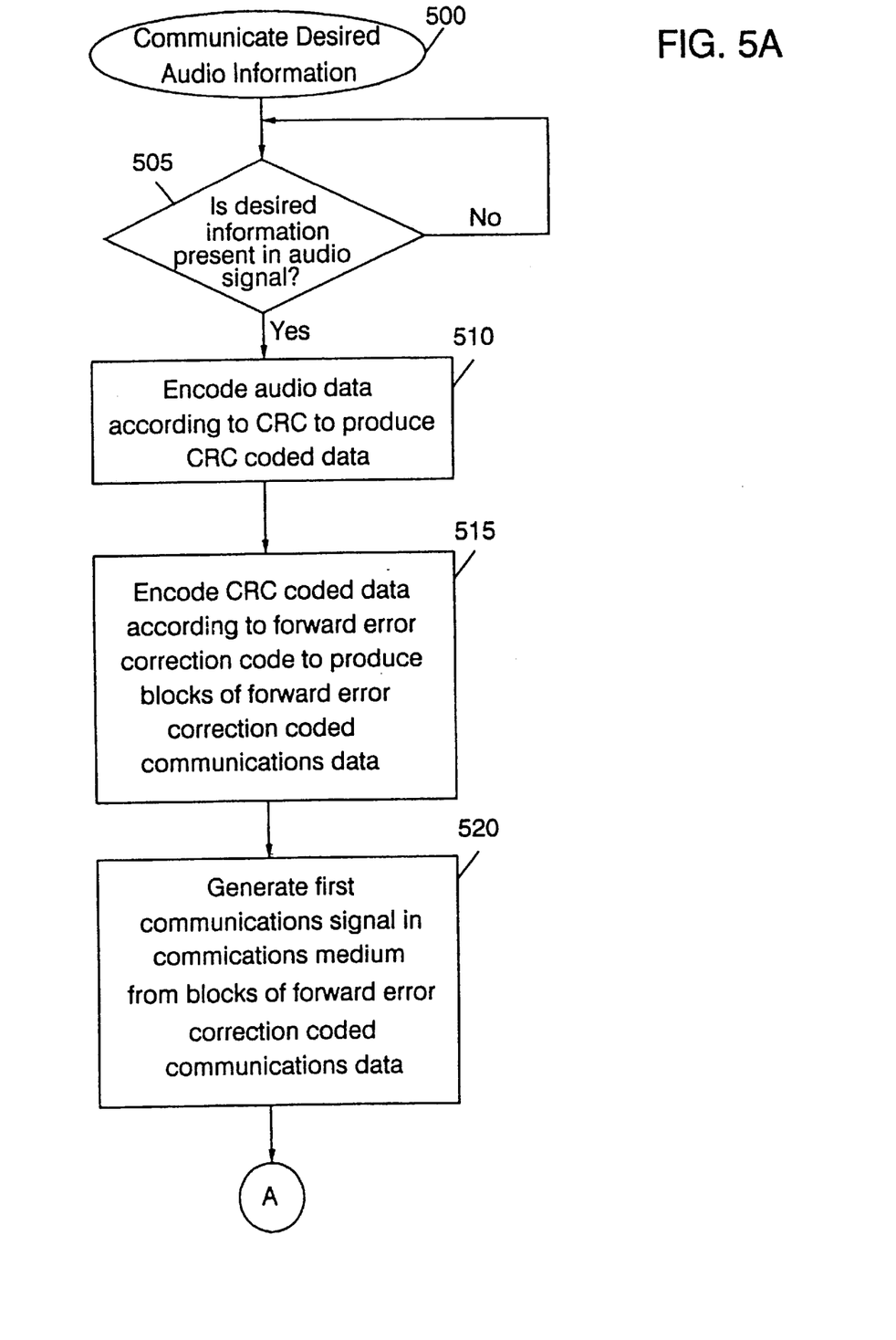
FIG. 5A–B are flowchart illustrations of operations for communicating audio information according to a method aspect of the present invention.
Figure 5B:
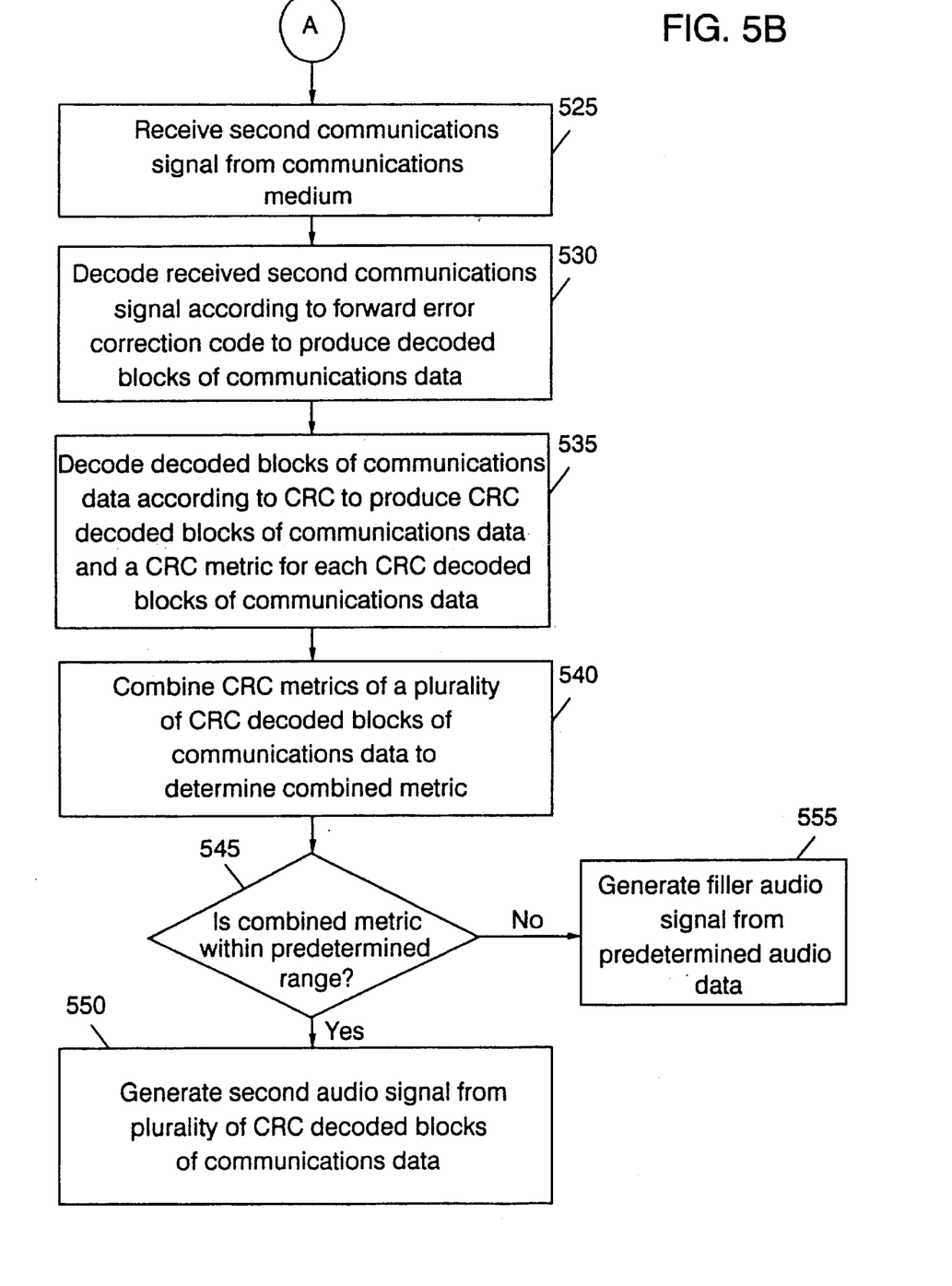

FIGS. 5A–B illustrate operations for communicating desired audio information in an audio signal according to another method aspect of the present invention (Block 500). If desired information is present in the audio signal (Block 505), audio data representing the first audio signal is encoded according to a CRC to produce CRC coded communications data (Block 510). The CRC coded communications data is then encoded according to a forward error correction code, for example, a convolutional code, to produce blocks of forward error correction coded communications data (Block 515), and the first communications signal is generated in the communications medium from the forward error correction coded communications data (Block 520). A second communications signal is received from the communications medium (Block 525), and the second received communications signal is decoded according to the forward error correction code to produce decoded blocks of communications data (Block 530). The decoded blocks of communications data are then decoded according to the CRC to produce CRC decoded blocks of communications data and a CRC metric for each of the CRC decoded blocks of communications data (Block 535). CRC metrics for a plurality of CRC decoded blocks of communications data are then combined to determine a combine metric (Block 540). If the combined metric is within a predetermined range (Block 545), a second audio signal is generated from the plurality of CRC decoded blocks of communications data (Block 550). If the combined metric is outside of the predetermined range (Block 545), a filler audio signal is generated, preferably from predetermined audio data (Block 555).

Figure 6:
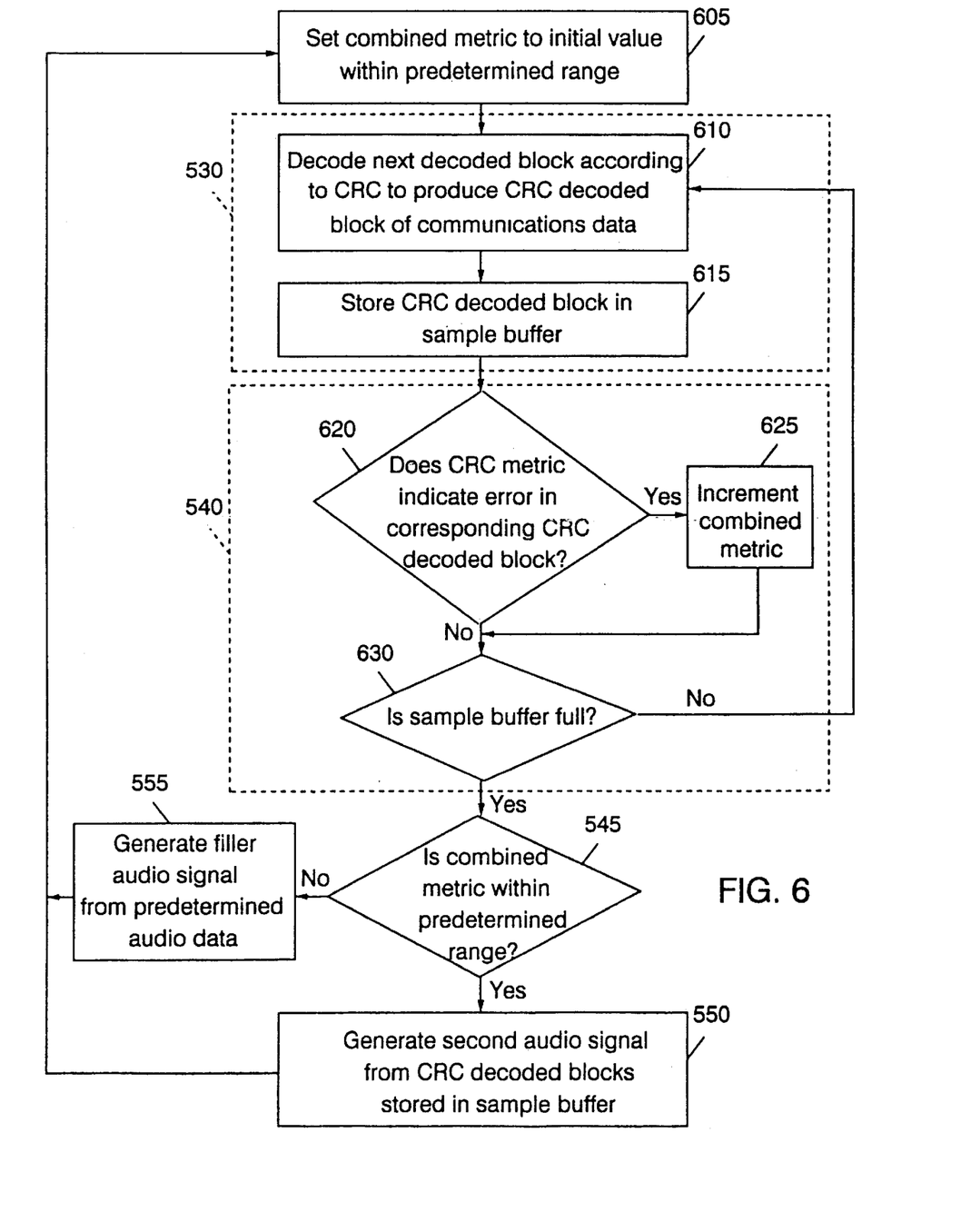
FIG. 6 is a flowchart illustration of operations for determining a metric of the validity of communications data according to the present invention.

Preferably, the plurality of CRC decoded blocks of communications represent a sequential plurality of blocks of communications data. As illustrated in FIG. 6, CRC metrics for the plurality of CRC decoded blocks may be combined to determine a combined metric by first setting the combined metric to an initial value within the predetermined range (Block 605). The step of decodingdecoded blocks of communications data (Block 530 of FIG. 5) may include producing a block of CRC decoded communications data and storing the block, for example, in a sample buffer (Blocks 610, 615). The step of combining CRC metrics for a plurality of CRC decoded blocks (Block 540 of FIG. 5) includes incrementing the combined metric for each stored block having a CRC metric indicating an error in the corresponding block (Blocks 620, 625). When the sample buffer fills (Block 630), the second audio signal is generated from the stored blocks of communications data when the combined metric is within the predetermined range (Blocks 545, 550). If the combined metric is outside of the predetermined range, a filler audio signal is generated (Block 555). The combined metric is then reset to the initial value (Block 605).

Figure 7:
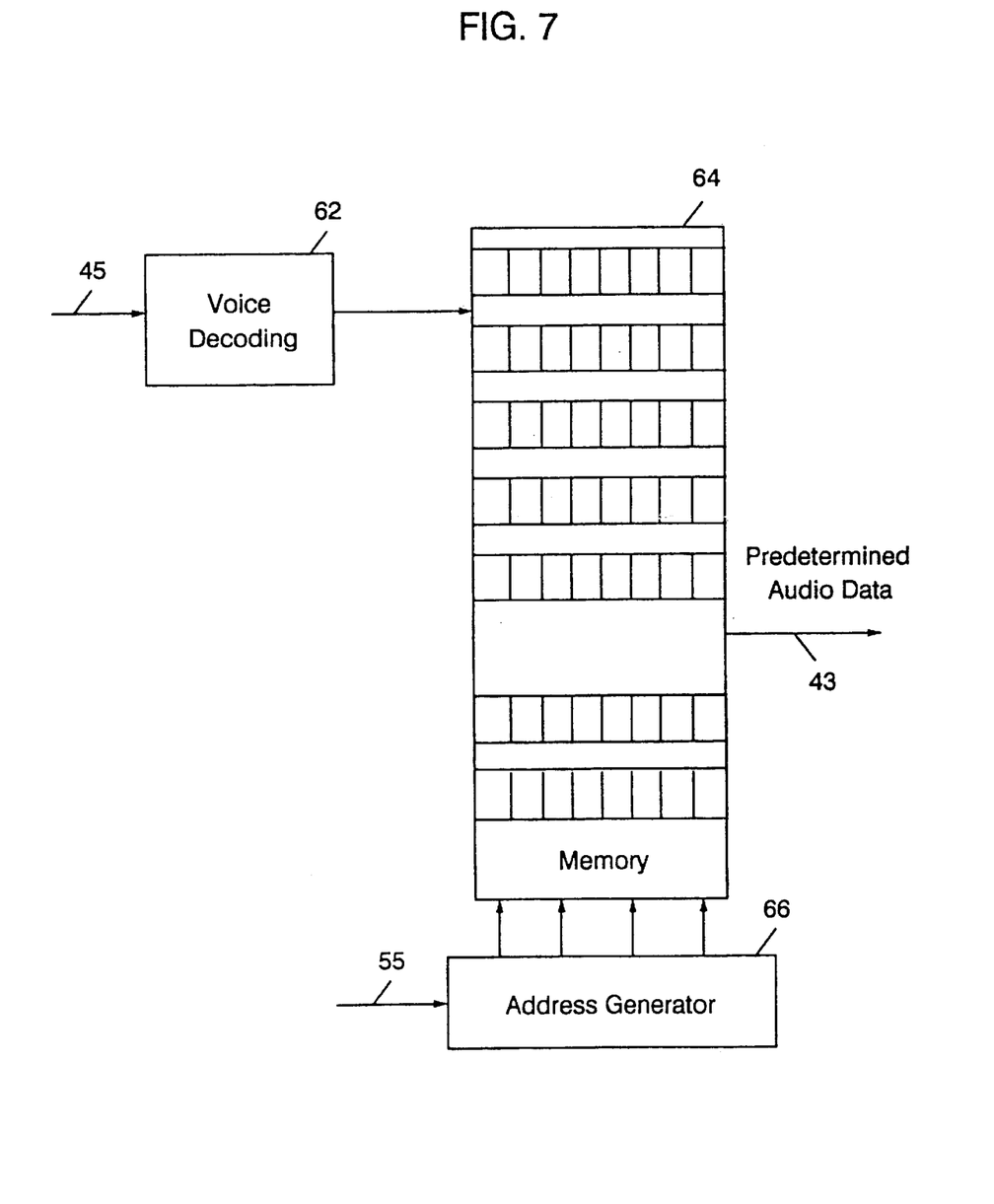
FIG. 7 is a schematic diagram illustrating generation of predetermined audio data according to the present invention.

As described above, the filler audio signal preferably is comfort noise, preferably generated from predetermined audio data derived from a previously received communications signal. As illustrated in FIG. 7, predetermined audio data 43 may be derived from blocks of communications data 45 produced from previously received communications signals and, for example, decoded by voice decoder 62 and stored in audio data storage 64, e.g., a digital memory or other storage device. The predetermined audio data 43 stored in audio data storage 64 may be retrieved, for example, by means 66 for cyclically retrieving data from the audio data storage, for example, an address generator which sequentially accesses memory locations when the metric 55 of the validity of communications data being received is outside of the predetermined range, as described above. Similarly, stored predetermined audio data 43 may be randomly retrieved, to generate a more random filler audio signal. Those skilled in the art will understand that the present invention may use a filler audio signal generated in a number of ways in addition to those described. For instance, predetermined audio data derived from a previously received signal may be processed by filtering and other signal processing techniques to remove voice or other information and leave background audio which is then used as the filler signal.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A communications system for communicating desired audio information intermittently present in a first audio signal over a communications medium, the system comprising:

discontinuous communications signal generating means for generating a first communications signal in the communications medium when the desired audio information is present in the first audio signal, the first communications signal representing the first audio signal encoded as blocks of communications data according to a predetermined code;

communications signal receiving means for receiving a second communications signal from the communications medium;

communications signal processing means, responsive to said communications signal receiving means, for processing the received second communications signal to produce processed blocks of communications data;

metric determining means, responsive to said communications signal processing means, for determining a decoding metric representing the validity of a plurality of the processed blocks of communications data decoded according to the predetermined code; and audio signal generating means for generating a second audio signal from the plurality of processed blocks of communications data when the metric is within a predetermined range and for generating a filler audio signal when the metric is outside of the predetermined range.

2. A system according to claim 1 wherein said discontinuous communications signal generating means comprises means for discontinuing generation of the communications signal in the communications medium when the desired audio information is absent from the first audio signal.

3. A system according to claim 2 wherein the desired audio information is voice information, and wherein said means for discontinuing generation comprises a voice activity detector.

4. A system according to claim 3 wherein said discontinuous communications signal generating means comprises means for generating the first communications signal without generating an explicit discontinuity message.

5. A system according to claim 1 wherein said discontinuous communications signal generating means comprises:

encoding means for encoding the first audio signal according to the predetermined code to produce coded blocks of communications data; and communications signal generating means, responsive to said encoding means, for generating the first communications signal from the coded blocks of communications data.

6. A system according to claim 5:

wherein said encoding means comprises forward error correction encoding means for encoding the first audio signal according to a forward error correction code to produce forward error correction coded blocks of communications data;

wherein said communications signal generating means comprises means for generating the first communications signal from the forward error correction coded blocks of communications data;

wherein said communications signal processing means comprises forward error control decoding means for decoding the received second communications signal according to the forward error correction code to produce decoded blocks of communications data and a forward error correction decoding metric for each of the decoded blocks of communications data, the forward error correction decoding metric representing the validity of the corresponding decoded block of communications data;

wherein said metric determining means comprises means, responsive to said forward error control decoding means, for combining forward error correction decoding metrics of a plurality of the decoded blocks of communications data to determine a combined metric of the validity of the plurality of decoded blocks of communications data; and wherein said audio signal generating means comprises means for generating the second audio signal from the decoded blocks of communications data when the combined metric is within a predetermined range and for generating a filler signal when the combined metric is outside of the predetermined range.

7. A system according to claim 6 wherein said means for combining forward error correction decoding metrics comprises means for combining forward error correction decoding metrics of a sequential plurality of the decoded blocks of communications data to determine the combined metric of the validity of the sequential plurality of decoded blocks of communications data.

8. A system according to claim 6:

wherein said forward error correction encoding means comprises convolutional encoding means for encoding the first audio signal according to a convolutional code to produce convolutionally coded blocks of communications data;

wherein said communications signal generating means comprises means for generating the first communications signal from the convolutionally coded blocks of communications data;

wherein said forward error correction decoding means comprises convolutional decoding means for decoding the received second communications signal according to the convolutional code to produce decoded blocks of communications data and a convolutional decoding metric for each of the decoded blocks of communications data, the convolutional decoding metric representing the validity of the corresponding decoded block of communications data; and wherein said means for combining decoding metrics comprises the step of combining convolutional decoding metrics of a plurality of the decoded blocks of communications data to determine a combined metric of the validity of the plurality of decoded blocks of communications data.

9. A system according to claim 5:

wherein said encoding means comprises:
cyclic redundancy code (CRC) encoding means for encoding the first audio signal according to a CRC to produce CRC coded audio data; and forward error correction encoding means, responsive to said CRC encoding means, for encoding the CRC coded audio data according to a forward error correction code to produce forward error correction coded blocks of communications data;

wherein said communications signal generating means comprises means for generating the first communications signal from the forward error correction coded blocks of communications data;

wherein said communications signal processing means comprises:
forward error correction decoding means for decoding the received second communications signal according to the forward error correction code to produce decoded blocks of communications data; and CRC decoding means, responsive to said forward error correction decoding means, for decoding the decoded blocks of communications data according to the CRC to produce CRC decoded blocks of communications data and to determine a CRC metric for each of the CRC decoded blocks of communications data, each CRC metric representing the validity of the corresponding CRC decoded block of communications data; wherein said metric determining means comprises:
means for combining CRC metrics of a plurality of the CRC decoded blocks of communications data to determine a combined metric of the validity of the plurality of CRC decoded blocks of communications data; and wherein said audio signal generating means comprises means for generating a second audio signal from the plurality of CRC decoded blocks of communications data when the corresponding combined metric is within a predetermined range and for generating a filler audio signal when the combined metric is outside of the predetermined range.

10. A system according to claim 9 wherein said means for combining CRC metrics of a plurality of the CRC decoded blocks of communications data comprises means for combining CRC metrics of a sequential plurality of the CRC decoded blocks of communications data.

11. A system according to claim 9 wherein said means for combining CRC metrics of a plurality of the CRC decoded blocks of communications data comprises:
means for setting the combined metric to an initial value within the predetermined range; and
means, responsive to said CRC decoding means, for incrementing the combined metric for each CRC decoded block of the plurality of CRC decoded blocks of communications data which has a CRC metric indicating an error.

12. A system according to claim 9:

wherein forward error correction encoding means comprises convolutional encoding means for encoding the CRC coded audio data according to a convolutional code to produce convolutionally coded blocks of communications data;

wherein said communications signal generating means comprises means for generating the first communications signal from the convolutionally coded blocks of communications data; and wherein said forward error correction decoding means comprises convolutional decoding means for decoding the received second communications signal according to the convolutional code to produce the decoded blocks of communications data.

13. A system according to claim 1 wherein said audio signal generating means comprises means for generating comfort noise when the metric is outside of the predetermined range.

14. A system according to claim 1 wherein said audio signal generating means comprises means for generating the filler audio signal from predetermined audio data.

15. A system according to claim 14, further comprising means for deriving the predetermined audio data from a previously received communications signal.

16. A system according to claim 15 wherein said means for deriving the predetermined audio data comprises audio data storing means, responsive to said audio signal generating means, for storing the predetermined audio data, and wherein said audio signal generating means comprises means, responsive to said audio data storing means, for generating the filler audio signal from the stored predetermined audio data when the metric is outside of the predetermined range.

17. A system according to claim 16 wherein said means for generating the filler audio signal from the stored predetermined audio data comprises:
means for cyclically retrieving the stored predetermined audio data to produce a cyclical audio data sequence; and
means, responsive to said cyclic retrieving means, for generating the filler audio signal from the cyclical audio data sequence.

18. A system according to claim 16 wherein said means for generating the filler audio signal from the stored predetermined audio data comprises:
means for randomly retrieving the stored predetermined audio data to produce a random audio data sequence; and
means, responsive to said random retrieving means, for generating the filler audio signal from the random audio data sequence.

19. A method of receiving audio information transmitted over a communications medium, the method comprising the steps of:

receiving a communications signal from the communications medium;

processing the received communications signal to produce processed blocks of communications data;

determining a decoding metric representing the validity of a plurality of the processed blocks of communications data decoded according to a predetermined code; and generating an audio signal from the plurality of processed blocks of communications data when the metric is within a predetermined range and generating a filler audio signal when the metric is outside of the predetermined range.

20. A method according to claim 19:

wherein said step of processing comprises the step of decoding the received communications signal according to a forward error correction code to produce decoded blocks of communications data and a forward error correction decoding metric for each of the decoded blocks of communications data, each forward error correction decoding metric representing the validity of the corresponding decoded block of communications data;

wherein said step of determining a metric comprises the step of combining forward error correction decoding metrics of a plurality of the decoded blocks of communications data to determine a combined metric of the validity of the plurality of decoded blocks of communications data; and wherein said step of generating comprises the step of generating the second audio signal from the decoded blocks of communications data when the combined metric is with in a predetermined range and generating the filler audio signal when the combined metric is outside of the predetermined range.

21. A method according to claim 20 wherein said step of combining forward error correction decoding metrics comprises the step of combining forward error correction decoding metrics of a sequential plurality of the decoded blocks of communications data to determine a combined metric of the validity of the sequential plurality of decoded blocks of communications data.

22. A method according to claim 20:

wherein said step of decoding comprises the step of decoding the received communications signal according to a convolutional code to produce decoded blocks of communications data and a convolutional decoding metric for each of the decoded blocks of communications data, each convolutional decoding metric representing the validity of the corresponding decoded block of communications data; and wherein said step of combining comprises the step of combining convolutional decoding metrics of a plurality of the decoded blocks of communications data to determine a combined metric the validity of the plurality of decoded blocks of communications data.

23. A method according to claim 20:

wherein said step of processing comprises the steps of:
  decoding the received communications signal according to a forward error correction code to produce decoded blocks of communications data ; and
  decoding the decoded blocks of communications data according to a cyclic redundancy code (CRC) to produce CRC decoded blocks of communications data and to determine a CRC metric for each of the CRC decoded blocks of communications data, each CRC metric representing the validity of the corresponding CRC decoded block of communications data;

wherein said step of determining a metric comprises the step of combining CRC metrics of a plurality of the CRC decoded blocks of communications data to determine a combined metric of the validity of the plurality of CRC decoded blocks of communications data; and wherein said step of generating comprises the step of generating a second audio signal from the plurality of CRC decoded blocks of communications data when the combined metric is within a predetermined range and generating the filler audio signal when the combined metric is outside of the predetermined range.

24. A method according to claim 23 wherein said step of combining CRC metrics of a plurality of the CRC decoded blocks of communications data comprises the step of combining CRC metrics of a sequential plurality of the CRC decoded blocks of communications data.

25. A method according to claim 23 wherein said step of decoding the decoded communications blocks according to the CRC is preceded by the step of setting the combined metric to an initial value within the predetermined range, and:

wherein said step of decoding the decoded communications blocks according to the CRC comprises the step of storing a sequential plurality of blocks of CRC decoded communications data;

wherein said step of combining CRC metrics of a plurality of blocks of CRC decoded communications data comprises the steps incrementing the combined metric for each of the CRC metrics of the stored blocks of CRC decoded communications data;

wherein said step of generating comprises the step of generating the second audio signal from the stored plurality of CRC decoded communications blocks when the combined metric is within the predetermined range and generating the filler audio signal from predetermined audio data when the combined metric is outside of the predetermined range; and wherein said step of generating is followed by the step of setting the combined metric to the initial value.

26. A method according to claim 23:

wherein said step of decoding the received communications signal according to a forward error correction code comprises the step of decoding the received communications signal according to a convolutional code.

27. A method according to claim 19 wherein said step of generating comprises the step of generating an audio signal from the plurality of processed blocks of communications data when the metric is within a predetermined range and generating comfort noise when the metric is outside of the predetermined range.

28. A method according to claim 19 wherein said step of generating comprises the step of generating the filler audio signal from predetermined audio data.

29. A method according to claim 28 wherein said step of generating the filler audio signal from predetermined audio data is preceded by the step of deriving the predetermined audio data from a previously received communications signal.

30. A method according to claim 29 wherein said step of generating the filler audio signal is preceded by the steps of:

receiving a communications signal from the communications medium;

processing the received communications signal to produce processed communications data;

generating the predetermined audio data from the processed communications data; and storing the generated predetermined audio data; and wherein said step of generating the filler audio signal from predetermined audio data comprises the step of generating the filler audio signal from the stored predetermined audio data.

31. A method according to claim 30 wherein said step of generating the filler audio signal from the stored predetermined audio data comprises the steps of:

cyclically retrieving the stored predetermined audio data to produce a cyclic audio data sequence; and generating the filler audio signal from the cyclic audio data sequence.

32. A method according to claim 30 wherein said step of generating the filler audio signal from the stored predetermined audio data comprises the steps of:

randomly retrieving the stored predetermined audio data to produce a random audio data sequence; and generating the filler audio signal from the random audio data sequence.

* * * * *